United States Patent
Hernacki et al.

(10) Patent No.: US 9,158,558 B1
(45) Date of Patent: Oct. 13, 2015

(54) METHODS AND SYSTEMS FOR PROVIDING APPLICATION MANIFEST INFORMATION

(75) Inventors: Brian Hernacki, San Carlos, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 1570 days.

(21) Appl. No.: 12/059,513

(22) Filed: Mar. 31, 2008

(51) Int. Cl.
G06F 9/44 (2006.01)
G06F 9/445 (2006.01)

(52) U.S. Cl.
CPC .................................. *G06F 9/445* (2013.01)

(58) Field of Classification Search
None
See application file for complete search history.

(56) References Cited

U.S. PATENT DOCUMENTS

| | | | | |
|---|---|---|---|---|
| 5,488,714 | A * | 1/1996 | Skidmore | 717/143 |
| 5,909,580 | A * | 6/1999 | Crelier et al. | 717/141 |
| 7,237,236 | B2 * | 6/2007 | Kershenbaum et al. | 717/154 |
| 7,516,476 | B1 * | 4/2009 | Kraemer et al. | 726/1 |
| 7,530,106 | B1 * | 5/2009 | Zaitsev et al. | 726/24 |
| 7,743,414 | B2 * | 6/2010 | Pouliot | 726/22 |
| 7,831,608 | B2 * | 11/2010 | Aizenbud-Reshef et al. | 707/758 |
| 2004/0093525 | A1 * | 5/2004 | Larnen | 713/201 |
| 2005/0283834 | A1 * | 12/2005 | Hall et al. | 726/24 |
| 2007/0261124 | A1 * | 11/2007 | Centonze et al. | 726/27 |
| 2009/0094667 | A1 * | 4/2009 | Habeck et al. | 726/1 |
| 2012/0330959 | A1 * | 12/2012 | Kretz et al. | 707/739 |
| 2013/0019315 | A1 * | 1/2013 | Chen et al. | 726/25 |

\* cited by examiner

*Primary Examiner* — Li B Zhen
*Assistant Examiner* — Evral Bodden
(74) *Attorney, Agent, or Firm* — ALG Intellectual Property, LLC (57) ABSTRACT

A computer-implemented method for providing application manifest information may include analyzing source code of a software application. The method may also include detecting that the source code is programmed to access a computer resource and determining a security implication of the source code being programmed to access the computer resource. Determining the security implication may include providing a notification of the security implication of the source code to a developer of the source code. Determining the security implication may also include providing information about the security implication in an application manifest. Systems and computer-readable-media for creating and editing application manifests are also disclosed.

20 Claims, 7 Drawing Sheets

METHODS AND SYSTEMS FOR PROVIDING APPLICATION MANIFEST INFORMATION

BACKGROUND

Over the next decade, computer security programs may continue to transition from primarily blacklist-based anti-malware solutions to whitelist-based solutions. Whitelist-based solutions may allow whitelisted software applications to run while blocking all other applications. However, whitelist-based solutions may not block all malicious code from executing. For example, a publisher may provide legitimate software for a period of time in order to gain trust and have the software whitelisted. The publisher may then introduce malicious code into the whitelisted software. As another example, a malicious developer in a trusted software company may introduce malware in a whitelisted program.

Traditional behavior-monitoring systems may provide some protection against malware in whitelisted software. Behavior-monitoring systems may monitor a software application and attempt to block malicious actions of the application. However, most traditional behavior-monitoring systems do not effectively evaluate and control the behavior of software applications.

Traditional behavior-monitoring systems may be ineffective because they may lack the information needed to determine whether a software application is acting maliciously. Behavior-monitoring systems may use generalized rules to monitor applications, but they may be unable to determine whether an application should be allowed to access a particular file or network resource.

Behavior-monitoring systems may attempt to analyze an application and determine all of the normal activities performed by the application. The behavior-monitoring systems may then prevent abnormal activity. However, analyzing most applications may result in a broad list of actions and may not provide the monitoring system with information that will allow effective behavior monitoring. For example, malicious activities may be treated as normal activities and may not be blocked.

SUMMARY

The present disclosure provides methods and systems for improving application behavior monitoring. Some embodiments may provide source-code developers with tools that help them generate application manifests for their source code. For example, a source-code evaluation module may analyze the source code of a software application and detect that the source code is programmed to access a computer resource. The evaluation module may then determine a first security implication of the source code being programmed to access the computer resource. The evaluation module may notify the developer of the first security implication.

In various embodiments, the evaluation module may query the developer about modifying the source code's access to the computer resource. The developer may decide not to modify the source code, may manually modify the source code, or may allow the evaluation module to automatically modify the source code. If the source code's access to the resource is not modified, the evaluation module may include information about the first security implication in an application manifest. If the source code's access is modified, the evaluation module may determine a second security implication of the source code's modified access to the computer resource. The evaluation module may include information about the second security implication in the application manifest.

In other embodiments, the evaluation module may not query the developer about modifying the source code's access to the computer resource. Instead, the evaluation module may automatically include information about the first security implication in an existing application manifest or may create a new application manifest and include the information about the first security implication in the new application manifest. The application manifest may be formatted to provide an application behavior monitor with the information about the security implication.

The computer resource may be any resource of a destination computer of the source code. The computer resource may also be any network resource available to a destination computer of the source code. For example, the computer resource may be a file, a file system, a folder, an application programming interface, a communication port, a peripheral device, and/or a network resource.

In some embodiments, the evaluation module may be a standalone tool or may be part of an integrated development environment. The evaluation module may analyze the source code as the source code is being created. Alternatively, the evaluation module may analyze the source code when the source code is compiled or at any other suitable time.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The following is intended to provide a detailed description of various exemplary embodiments and should not be taken to be limiting in any way. Various exemplary methods and systems for providing application manifest information are described and/or illustrated herein. The instant disclosure presents tools that may help source-code developers create accurate application manifests. Some embodiments may automatically create application manifests.

Creating application manifests that accurately describe the function of a software application may be particularly important when the application manifest may be used by a behavior monitor that monitors the software application. However, developers may not typically have any incentive to create accurate, detailed application manifests. For example, in creating an application manifest, a developer may choose the easiest path and ask for maximum access to resources. Such an application manifest may not be very useful in behavior monitoring. Furthermore, developers may typically create an application manifest after finishing development of the software application. However, the developer may not remember or have time to research the exact resource access needs of the software application. Thus, the application manifest may be overbroad, incomplete, or even inaccurate.

Embodiments of the present disclosure may help developers create accurate application manifests that can be used by behavior monitoring systems. Some embodiments may provide an interactive process that generates application manifests while the software application is being developed. In other embodiments, an evaluation module may automatically evaluate the source code and create the application manifest based on information obtained from the source code, which may result in a more accurate, detailed application manifest.

Embodiments of the instant disclosure may also prompt developers to create code that may evaluate as less "risky." For example, an evaluation module may notify a developer if the source code may behave in a way that would cause an application-behavior monitor to issue an alert or warning. The developer may not want the code to continuously trigger behavior-monitor alerts because such code may appear insecure to a user. The evaluation module may suggest changes that will help the developer create code that a behavior monitor may consider safe.

Figure 1:
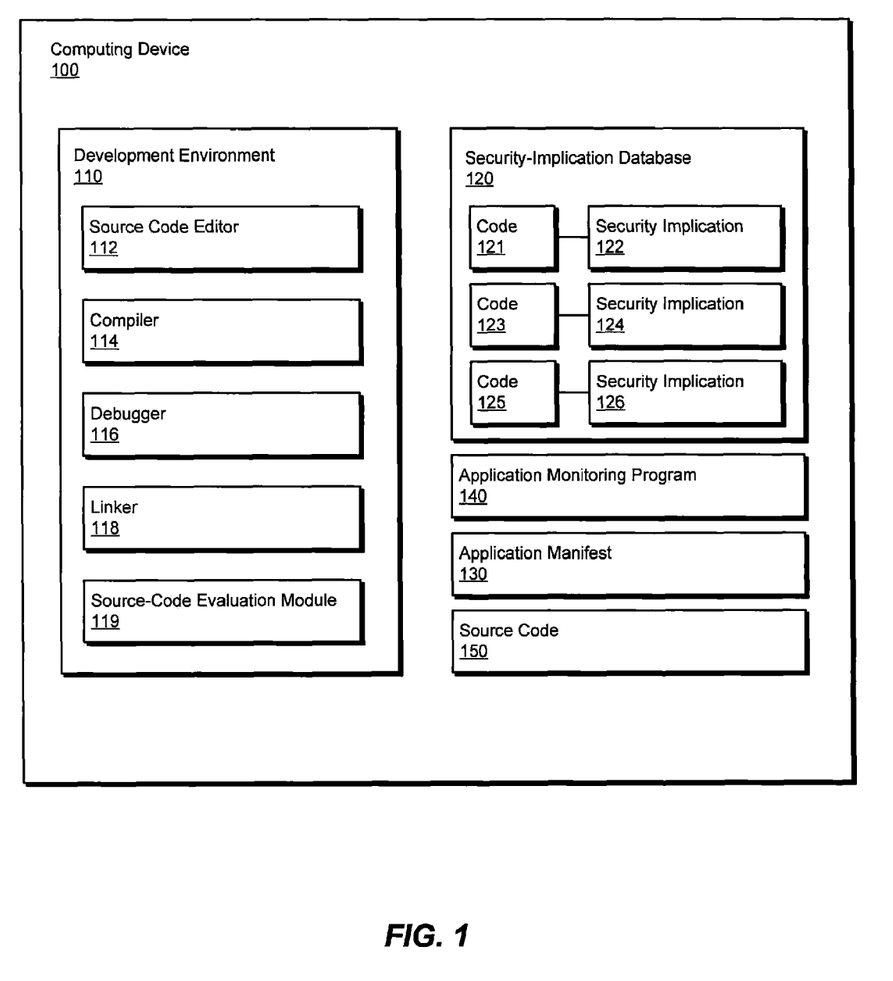
FIG. 1 is a block diagram of an exemplary computing device according to certain embodiments.

FIG. 1 is a block diagram of a computing device 100. Computing device 100 may be a desktop computer, a laptop computer, a handheld computer, a network computing device, or any other suitable computing device. Computing device 100 may include a development environment 110 for developing source code 150. Development environment 110 may be an Integrated Development Environment (IDE) with a source code editor 112, a compiler 114, a debugger 116, and a linker 118. Development environment 110 may also comprise any other tools for developing software programs.

In addition to traditional software development tools, development environment 110 may also include a source-code evaluation module 119. While FIG. 1 shows source-code evaluation module 119 as part of development environment 110, source-code evaluation module 119 may also be a stand-alone tool or may be part of any other software development tool.

Source-code evaluation module 119 may analyze source code 150 to detect code that is programmed to access a computer resource. After detecting code that is programmed to access a computer resource, source-code evaluation module 119 may determine a security implication of the source code being programmed to access the computer resource. For example, source-code evaluation module 119 may detect that source code 150 is programmed to have access to directories (e.g., a "My Documents" directory) that may contain sensitive personal information of an end user of source code 150.

Source-code evaluation module 119 may determine a security implication of source code 150 being programmed to access the resource by comparing the code that is programmed to access the resource against entries in security-implication database 120. Security-implication database may associate code, such as code 121, 123, and 125 with security implications, such as security implications 122, 124, and 126. As shown in FIG. 1, code 121 may be associated with security implication 122, code 123 may be associated with security implication 124, and code 125 may be associated with security implication 126. Security implications 122, 124, and 126 may provide security access information, information formatted to be included in an application manifest, information formatted to be displayed to a code developer, and/or any other information related to security implications of code. The code developer may be any user that creates, programs, edits, or otherwise works with source code 150.

In one example, code 121 may represent code programmed to access a "My Documents" folder on an end-user's machine, and security implication 122 may provide access-scope information that states the code is programmed to access the "My Documents" folder. Code 123 may represent code programmed to access a critical system resource, and security implication 124 may provide access-scope information that states the code is programmed to access the system resource. Code 125 may represent code programmed to access the internet, and security implication 126 may provide access-scope information that states the code is programmed to access the internet.

If source code 150 is programmed to access the "My Documents" folder, source-code evaluation module 119 may detect that source code 150 is programmed to detect the "My Documents" folder by identifying that the source code is comparable to code 121 in security-implication database 120. Source-code evaluation module 119 may determine a security implication of source code 150 by reading or retrieving security implication 122.

After determining security implication 122 of source code 150, source-code evaluation module 119 may ask the developer whether source code 150 really needs broad access to the "My Documents" folder. Source-code evaluation module 119 may also offer to modify the source code to provide more tailored access that would not cause a behavior monitor to provide warnings to an end user about the code's broad access to the "My Documents" folder. If the developer agrees to allow source-code evaluation module 119 to edit source code 150, source-code evaluation module 119 may automatically edit source code 150 and may include information about the source-code's narrower access in application manifest 130.

If the developer does not agree to allow source-code evaluation module 119 to edit source code 150, the developer may manually edit source code 150. Source-code evaluation module 119 may determine a security implication of the edited code and may include information about the new security implication in application manifest 130. If the developer decides not to modify the source code, source-code evaluation module 119 may include information about security implication 122 in application manifest 130. An example of an application manifest is provided in FIG. 4.

The information about security implication 122 that is included in application manifest 130 may comprise security implication 122 or any other information that may convey a scope of access indicated by security implication 122 to a behavior monitor. In some embodiments, security-implication database 120 may be populated with entries that help source-code evaluation module 119 identify source code that may cause application monitoring program 140 to issue warnings, alerts, or any other notifications to an end user of source code 150 (e.g., an end user of an application built from source code 150).

Security-implication database 120 may include a set of knowledge that indicates what code creates security-access risks. Security-implication database 120 may also provide knowledge about how code creates security-access risks. Security-implication database 120 may obtain some or all of this knowledge from application monitoring program 140 (e.g., security-implication database 120 may contain knowledge of code that, when executed, will trigger a response from application monitoring program 140). The knowledge in security-implication database 120 may also be generated through any other suitable mechanism. Security-implication database 120 may identify application programming interfaces of concern, data access issues, and various other security issues.

Source-code evaluation module 119 may create application manifest 130. In other embodiments, application manifest 130 may already exist and source-code evaluation module 119 may modify application manifest 130. Application manifest 130 may be updated or created as a developer enters and edits source code 150 in source code editor 112. In other words, application manifest 130 may be updated in "real time" and may accurately reflect the contents of source code 150. In other embodiments, application manifest 130 may be created or modified when source code 150 is compiled by compiler 114. Application manifest 130 may also be modified or generated when the developer uses debugger 116 or linker 118 on source code 150. Thus, source-code evaluation module 119 may run during programming, compilation, debugging, linking, and/or at any other suitable time.

Figure 2:
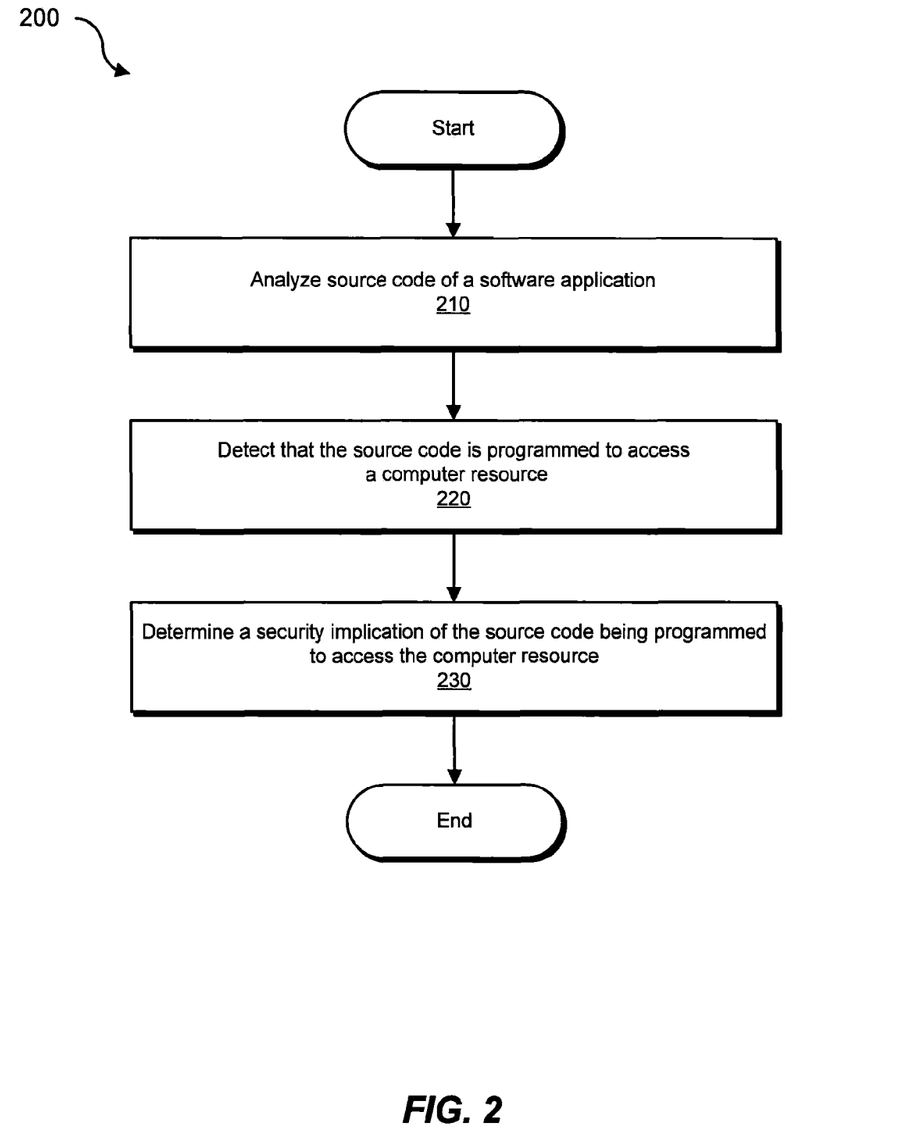
FIG. 2 is a flow diagram of an exemplary method for enabling the creation of application manifests.

FIG. 2 is a flow diagram of a computer-implemented method for providing application manifest information. A source-code evaluation module may analyze source code of a software application (step 210). The source code may be any sequence of statements and/or declarations written in a human-readable computer programming language. Source code may typically be held in one or more text files. In other words, the term "source code" may refer to a single file or a collection of files in a human-readable format that may be converted to a computer-executable form. A compiler may convert source code into an object file, and a linker may include the object file in an executable program. The software application referred to in step 210 may be any executable file that includes the transformed source code.

After analyzing the source code of the software application, the source-code evaluation module may detect that the source code is programmed to access a computer resource (step 220). The source-code evaluation module may detect that the source code is programmed to access the resource by detecting sections of the code that request read access, write access, copy access, or any other access to a resource of a computer. The source-code evaluation module may also detect that the source code is programmed to access the resource by analyzing declarations and other variables in the source code. The source-code evaluation module may analyze the source code in any other suitable manner to detect that the source code is programmed to access a computer resource. For example, the source-code evaluation module may compare to source code to code descriptions or entries in a security-implication database.

The computer resource referred to in step 220 may be a file system, a file, a folder, an application-programming interface, a network resource, a peripheral device (e.g., external storage devices, input devices, output devices, etc.) and/or a communication port of a destination computer of the software application (a destination computer of the software application may be any computing device on which the software application may be installed). The computer resource may also be a file system, a file, a folder, an application-programming interface, a network resource, a peripheral device, and/or a communication port of a network computing device accessible through the destination computer. The resource may also be any other data, application, and/or process running on the destination computer or on any network device accessible through the destination computer.

The source-code evaluation module may determine a security implication of the source code being programmed to access the computer resource (step 230). In other words, the source-code evaluation module may determine whether there is a security implication (e.g., a potential security risk) associated with an access-scope declaration or potential resource access of the source code. A security implication may be any information about the source code's potential access to the computer resource. For example, a security implication may state that the source code is programmed to have broad access to potentially sensitive computer resources. A potentially sensitive resource may be a folder, a file, or any other resource that may contain financial information (e.g., bank account information, credit card information, etc.), personal information (e.g., social security numbers, birthdays, passwords), or any other information that a user may want to keep others from accessing.

Figure 3:
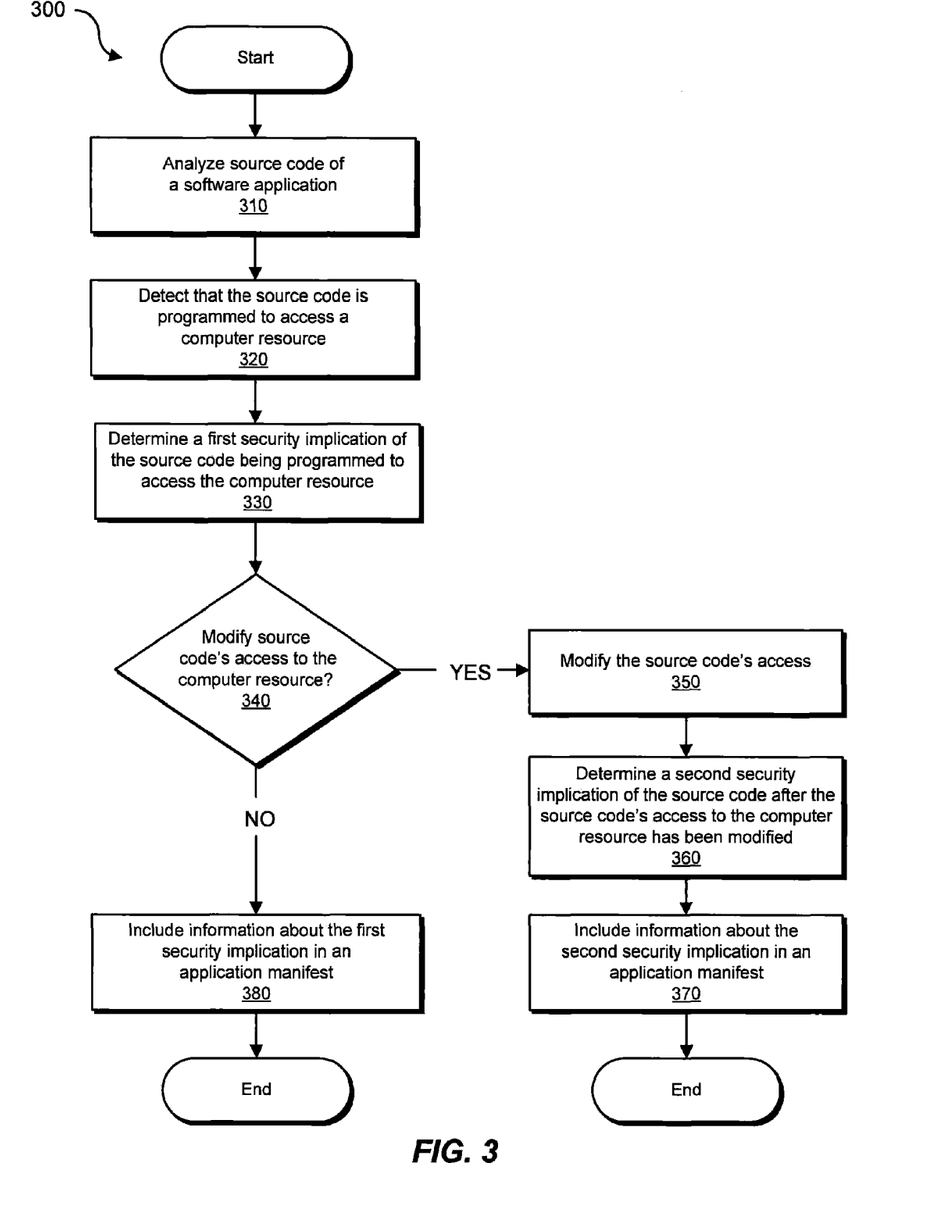
FIG. 3 is a flow diagram of another exemplary method for enabling the creation of application manifests.

FIG. 3 is another flow diagram of an exemplary method 300 for providing application manifest information. A source-code evaluation module may analyze source code of a software application (step 310). The source-code evaluation module may analyze the source code by searching or scanning the source code for access-scope definitions in the source code. An access-scope definition may be any variable or other declaration that sets forth which destination-computer resources the source code may be able to access. The source-code evaluation module may also analyze instructions and other information in the source code to determine which destination-computer resources the source code may be able to access.

While analyzing the source code, the source-code evaluation module may detect that the source code is programmed to access a computer resource (step 320). The source-code evaluation module may then determine a first security implication of the source code being programmed to access the computer resource (step 330). In some embodiments, determining the first security implication may comprise providing a notification of the security implication of the source code to a developer of the source code. The notification may query the developer about whether to modify the source code's access to the computer resource (decision point 340).

In response to the query or suggestion, the developer may modify the source code's access to the resource (step 350). Alternatively, the developer may choose to allow the source-code evaluation module to automatically modify the source code's access. If the source code's access has been modified (either by the developer or by the source-code evaluation module), the source-code evaluation module may determine a second security implication of the modified source code's access to the resource (step 360). In other words, the source-code evaluation module may reevaluate the security implications of the source code after the source code has been edited.

After determining the second security implication of the source code, the source-code evaluation module may include information about the second security implication in an application manifest (step 370). Alternatively, if the source code is not modified, information about the first security implication may be included in an application manifest (step 380). In other embodiments, the source-code evaluation module does not query the developer (e.g., decision point 340 may be skipped). In such embodiments, after determining the first security implication, the source-code evaluation module may automatically include information about the first security implication in an application manifest.

In some embodiments, the source-code evaluation module may analyze the source code to make a predetermination of how the source code would score in a security analysis. If the resource-access scope of the program would affect the code's treatment by a behavior monitor or security analysis tool, the source-code evaluation module may explain the issue to the developer (e.g., the source-code evaluation module may display a notification to the user that contains information about the security implications of the source code). The source-code evaluation module may suggest alternatives or may offer to automatically modify the source code.

For example, the source-code evaluation module may detect a generic file system access tainted by user input. The source-code evaluation module may alert the developer that the requested access and taint may result in a low score in a security analysis. The source-code evaluation module may suggest eliminating the taint and/or limiting access scope in a manner that would result in a better security-analysis score. The developer may select a remediation option and the source-code evaluation module may automatically implement the selected remediation by editing the source code. For example, the source-code evaluation module may edit the source code to limit access to a specific file type, such as word processor documents. The source-code evaluation module may generate application manifest data stating that the source code is only allowed to access word processor documents. Thus, if the code attempts to access other types of documents, a behavior monitor may block the access attempt and/or provide an alert to a user.

Figure 4:
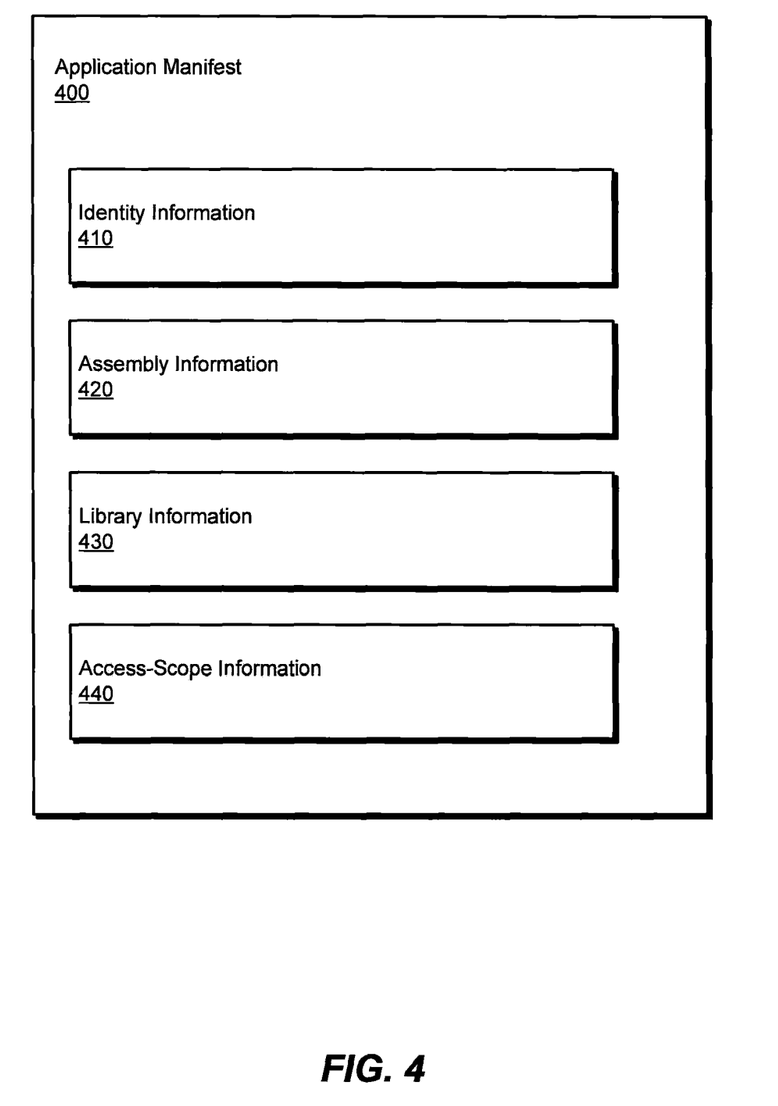
FIG. 4 is a block diagram of an exemplary application manifest according to certain embodiments.

FIG. 4 is a block diagram of an exemplary application manifest 400. In some embodiments, application manifest 400 may be referred to as a ".exe manifest file." Application manifest 400 may describe a software application's assembly, dependent libraries, and/or permissions (e.g., access scope) required by the software application. For example, application manifest 400 may include identify information 410 (e.g., information that identifies the software application), assembly information 420, library information 430, and access-scope information 440. In some embodiments, application manifests may include additional information not shown in FIG. 4, or may not include one or more of the data fields shown in FIG. 4.

Access-scope information 440 may be information about one or more security implications of the source code. In other words, access-scope information 440 may define or describe the breadth of the resource access required, requested, and/or programmed in the source code. Access-scope information 440 may accurately represent the resource-access scope of the source code and may therefore enable an application monitor that uses application manifest 400 to more effectively monitor the software application.

Figure 5:
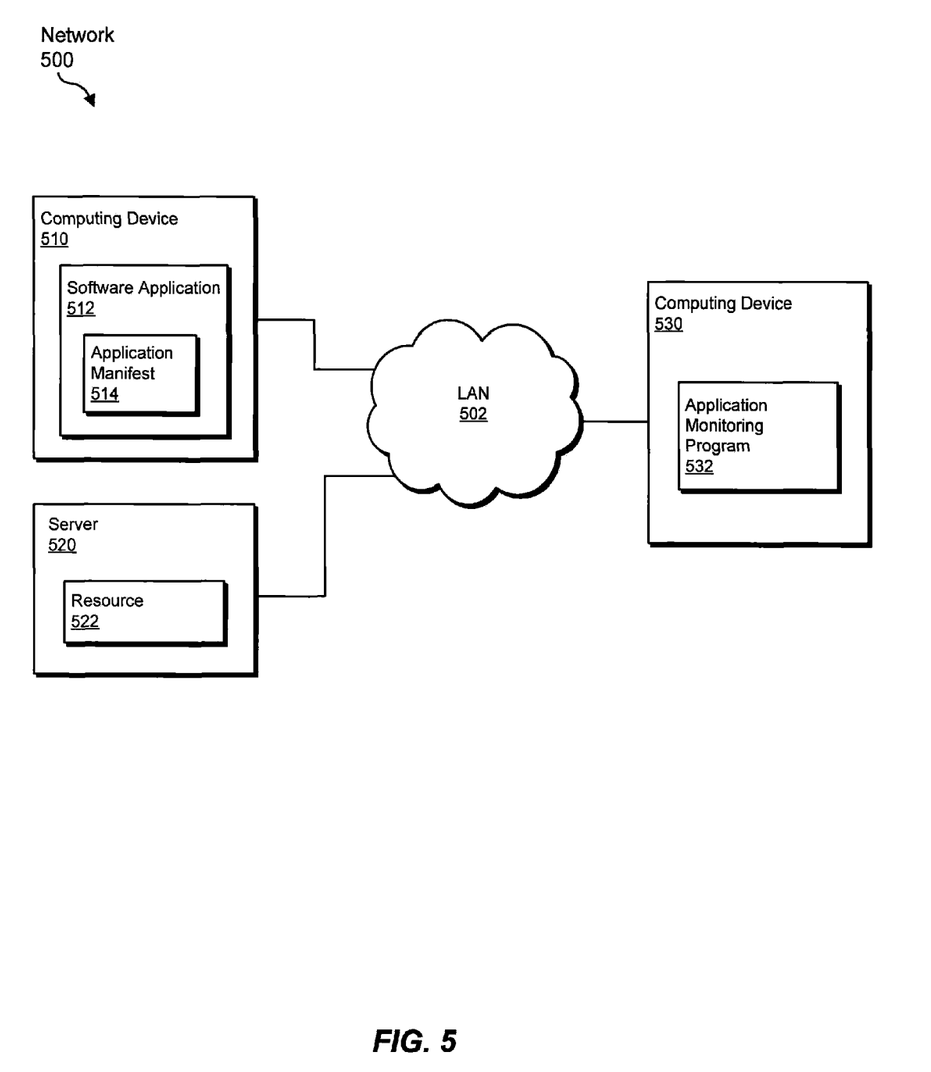
FIG. 5 is a block diagram of an exemplary network according to certain embodiments.

FIG. 5 shows a network 500 with a Local Area Network (LAN) 502, a computing device 510, a server 520, and a computing device 530. Computing device 510, server 520, and computing device 530 may communicate through LAN 502. Computing device 510 may include a software application 512 with an application manifest 514. Server 520 may include a resource 522, and computing device 530 may include an application monitoring program 532. Application monitoring program 532 may monitor applications running on computing devices connected to LAN 502, such as software application 512. In other embodiments, application monitoring program 532 may be installed on computing device 510.

In one example, software application 512 may attempt to access resource 522 on server 520. In other embodiments, resource 522 may be a resource of computing device 510. Application monitoring program 532 may detect that software application 512 is attempting to access resource 522. Application monitoring program 532 may use application manifest 514 to determine whether resource 522 is within a resource-access scope of software application 512. Application monitoring program 532 may determine that resource 522 is outside the access scope indicated by application monitoring program 532 and may alert a user of computing device 510 that software application 512 is attempting to access a resource outside its defined scope. Application monitoring program 532 may also ask the user whether to allow software application 512 access to resource 522.

Figure 6:
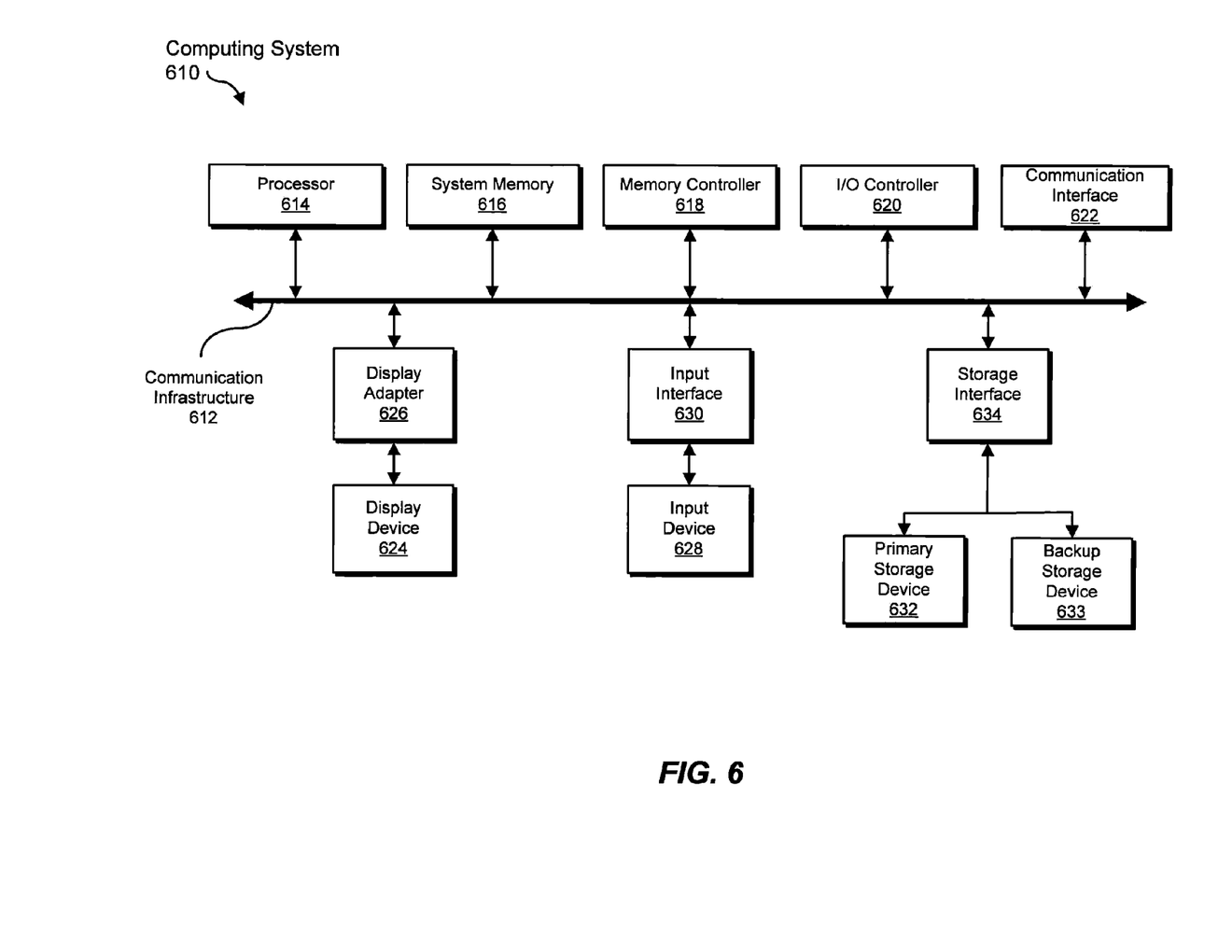
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the receiving, analyzing, detecting, determining, modifying, providing, and including steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as receiving, analyzing, detecting, determining, modifying, providing, and including.

I/O controller 620 generally represents any type or form of module capable of coordinating and/or controlling the input and output functions of a computing device. For example, in certain embodiments I/O controller may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the receiving, analyzing, detecting, determining, modifying, providing, and including steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the receiving, analyzing, detecting, determining, modifying, providing, and including steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the receiving, analyzing, detecting, determining, modifying, providing, and including steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, the exemplary file systems disclosed herein may be stored on primary storage device 632, while the exemplary file-system backups disclosed herein may be stored on backup storage device 633. Storage devices 632 and 633 may also be used, for example, to perform and/or be a means for performing, either alone or in combination with other elements, one or more of the receiving, analyzing, detecting, determining, modifying, providing, and including steps disclosed herein. Storage devices 632 and 633 may also be used to perform and/or be a means for performing other steps and features set forth in the instant disclosure.

Many other devices or subsystems may be connected to computing system 710. Conversely, all of the components and devices illustrated in FIG. 6 need not be present to practice the embodiments descried and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a software application (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the software application may be loaded into computing system 610. All or a portion of the software application stored on the computer-readable medium may then be stored in system memory 616 and/or various portions of storage devices 632 and 633. When executed by processor 614, a software application loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
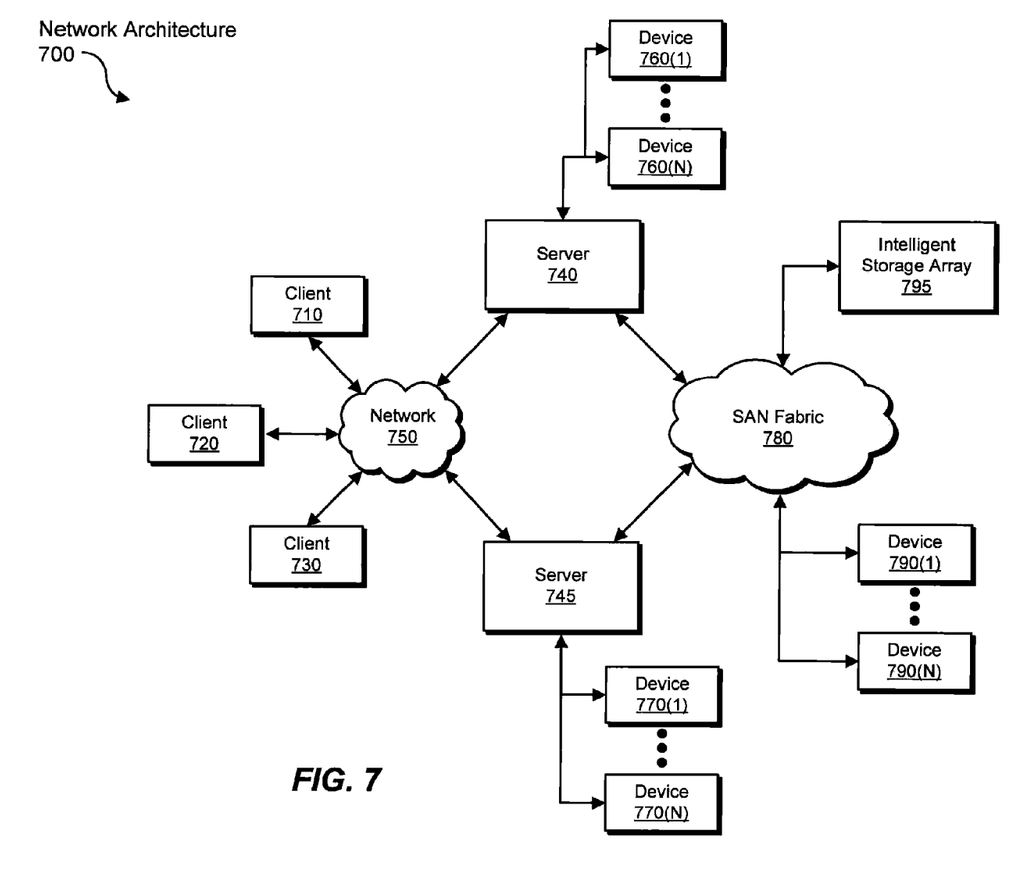
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and intelligent storage array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a software application and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a software application, stored in server 740, run by server 745, and distributed to client systems 710, 720, and 730 over network 750. Accordingly, network architecture 700 may perform and/or be a means for performing, either alone or in combination with other elements, one or more of the receiving, analyzing, detecting, determining, modifying, providing, and including steps disclosed herein.

As detailed above, computing system 610 and/or one or more of components of network architecture 700 may perform and/or be means for performing, either alone or in combination with other elements, one or more steps of the exemplary computer-implemented methods described and/or illustrated herein. According to certain embodiments, a computer-implemented method may comprise analyzing source code of a software application, detecting that the source code is programmed to access a computer resource, and determining a security implication of the source code being programmed to access the computer resource.

In some embodiments, determining the security implication may comprise providing a notification of the security implication of the source code to a developer of the source code. The notification may comprise a query to the developer about modifying the sources code's access to the computer resource. In some embodiments, the method may comprise receiving a response to the query and modifying the source code's access to the resource based on the response.

In various embodiments, determining the security implication may comprise including information about the security implication in an application manifest. The information about the security implication may be access-scope information. In some embodiments, the information about the security implication may be included in the application manifest when the source code is compiled or while the source code is being programmed.

According to various embodiments, the application manifest may be formatted to provide an application behavior monitor with the information about the security implication. In some embodiments, the resource of a computer may comprise a file system, a file, a folder, an application programming interface, a network resource, or a communication port.

The computer-implemented method may further comprise accessing a database. The database may associate the source code with the security implication. In some embodiments, the database may identify code that, when executed, will trigger a response from an application behavior monitor. In various embodiments, determining the security implication of the source code may be performed by an add-on for an integrated development environment or a stand-alone software evaluation application.

According to certain embodiments, a computer-readable media may comprise one or more computer-executable instructions that, when executed by a computing device, may cause the computing device to analyze source code of a software application, detect that the source code is programmed to access a computer resource, and determine a security implication of the source code being programmed to access the computer resource.

In some embodiments, the one or more computer-executable instructions may be further operable to cause the computing device to provide a notification of the security implication of the source code to a program of the source code. In some embodiments, the one or more computer executable instructions may be further operable to cause the computing device to receive a response to the notification and modify the source code's access to resource based on the response. In some embodiments, the one or more computer-executable instructions may be further operable to cause the computing device to include information about the security implication in application manifest.

According to certain embodiments, a computer-implemented method for providing application manifest information may comprise analyzing source code of a software application while the source code is being created. The computer-implemented method may also comprise detecting that source code is programmed to access a computer resource. The method may comprise providing a first security implication of the source code being programmed to access the computer resource and providing a notification of the first security implication of the source code.

The computer-implemented method may further comprise receiving a response to the notification and modifying the source code's access to the computer resource based on the response. The method may further comprise determining a second security implication of the source code after the source code's access to the resource has been modified and including information about the second security implication in an application manifest.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for providing application manifest information, the computer-implemented method comprising:
   analyzing source code of a software application by at least one of searching and scanning the source code;
   while analyzing the source code, detecting that the source code is programmed to access a computer resource, wherein the computer resource comprises at least one of a security-related application programming interface and security-related data;
   determining a security implication of the source code being programmed to access the computer resource by:
      determining that the source code is programmed to access at least one of the security-related application programming interface and the security-related data;
      making a predetermination of how a security analysis tool would score the source code in a security analysis, wherein making the predetermination comprises determining that the security analysis tool would assign the source code a score categorized as low;

in response to determining that the security analysis tool would assign the source code the score categorized as low:
  alerting a developer of the source code that the programmed access may result in the score categorized as low;
  prompting modification of the source code to limit access scope in a manner that will result in an improved security analysis score by presenting a remediation option;
  in response to selection of the remediation option:
    automatically implementing the selected remediation option by editing the source code;
    generating, for an application manifest that is formatted to provide an application behavior monitor with information about functionality of the software application, application manifest data stating that the source code has the limited access scope.

2. The computer-implemented method of claim 1, wherein prompting modification of the source code comprises providing a notification of the security implication of the source code to the developer of the source code.

3. The computer-implemented method of claim 2, wherein the notification comprises a query to the developer about modifying access by the source code to the computer resource.

4. The computer-implemented method of claim 3, further comprising:
  receiving a response to the query;
  modifying access by the source code to the computer resource based on the response.

5. The computer-implemented method of claim 2, wherein providing the notification of the security implication comprises offering to automatically modify the source code to limit access scope in the manner that will result in the improved security analysis score.

6. The computer-implemented method of claim 1, wherein the application manifest provides identity information about the software application, library information about the software application, assembly information about the software application, and access-scope information about the limited access scope.

7. The computer-implemented method of claim 1, wherein at least one of searching and scanning the source code comprises analyzing at least one of declarations and other variables in the source code.

8. The computer-implemented method of claim 1, wherein at least one of searching and scanning the source code comprises at least one of searching and scanning the source code for access-scope definitions within the source code.

9. The computer-implemented method of claim 1, wherein at least one of searching and scanning the source code comprises analyzing instructions in the source code to identify destination-computer resources the source code may be able to access.

10. The computer-implemented method of claim 1, wherein the computer resource comprises the security-related application programming interface.

11. The computer-implemented method of claim 1, further comprising storing information about how particular types of code create security risks in a security-implication database by populating the security-implication database with entries that identify source code that causes the application behavior monitor to issue warnings to an end user, wherein the information about how particular types of code create security risks identifies at least one of the security-related application programming interface and the security-related data.

12. The computer-implemented method of claim 11, wherein information stored in the security-implication database is at least partially obtained from the application behavior monitor.

13. The computer-implemented method of claim 11, wherein the information about how particular types of code create security risks identifies the security-related data.

14. A non-transitory computer-readable medium comprising one or more computer-executable instructions that, when executed by a computing device, cause the computing device to:
  analyze source code of a software application;
  detect that the source code is programmed to access a computer resource, wherein the computer resource comprises at least one of a security-related application programming interface and security-related data;
  determine a security implication of the source code being programmed to access the computer resource by:
  determining that the source code is programmed to access at least one of the security-related application programming interface and the security-related data;
  making a predetermination of how a security analysis tool would score the source code in a security analysis, wherein making the predetermination comprises
  determining that the security analysis tool would assign the source code a score categorized as low;
  in response to determining that the security analysis tool would assign the source code the score categorized as low:
    alert a developer of the source code that the programmed access may result in the score categorized as low;
    prompt modification of the source code to limit access scope in a manner that will result in an improved security analysis score by presenting a remediation option;
    in response to selection of the remediation option:
      automatically implement the selected remediation option by editing the source code;
      generating, for an application manifest that is formatted to provide an application behavior monitor with information about functionality of the software application, application manifest data stating that the source code has the limited access scope.

15. The non-transitory computer-readable medium of claim 14, wherein the one or more computer-executable instructions are further operable to cause the computing device to determine the security implication at least in part by causing the computing device to detect a generic file system access tainted by user input.

16. The non-transitory computer-readable medium of claim 15, wherein the one or more computer-executable instructions are further operable to cause the computing device to prompt modification of the source code by:
  alerting the developer of the source code that the generic file system access tainted by the user input may result in the score categorized as low;
  suggesting a plurality of options that would result in the improved security analysis score.

17. The non-transitory computer-readable medium of claim 16, wherein the plurality of options comprises:
  eliminating the taint caused by the user input;
  limiting the generic file system access.

18. A computer-implemented method for providing application manifest information, the computer-implemented method comprising:

analyzing source code of a software application by at least one of searching and scanning the source code while the source code is being created;
detecting that the source code is programmed to access a computer resource;
determining a security implication of the source code being programmed to access the computer resource by making a predetermination of how a security analysis tool would score the source code in a security analysis, wherein making the predetermination comprises determining that the security analysis tool would assign the source code a score categorized as low;
in response to determining that the security analysis tool would assign the source code the score categorized as low:
alerting a developer of the source code that the programmed access may result in the score categorized as low;
prompting modification of the source code to limit access scope in a manner that will result in an improved security analysis score by resenting a remediation option;
in response to selection of the remediation option:
automatically implementing the selected remediation option by editing the source code;
generating for an application manifest that is formatted to provide an application behavior monitor with information about functionality of the software application, application manifest data stating that the source code has the limited access scope.

19. The computer-implemented method of claim 18, wherein the application manifest data states that access is limited to a specific file type.

20. The computer-implemented method of claim 19, wherein
the file type corresponds to word processor documents.

* * * * *

UNITED STATES PATENT AND TRADEMARK OFFICE
CERTIFICATE OF CORRECTION

PATENT NO. : 9,158,558 B1
APPLICATION NO. : 12/059513
DATED : October 13, 2015
INVENTOR(S) : Brian Hernacki and William E. Sobel It is certified that error appears in the above-identified patent and that said Letters Patent is hereby corrected as shown below:

In the Claims

Claim 18, at column 18, line 3, should read:
analysis score by presenting a remediation option;

Claim 18, at column 18, lines 7 to 8, should read:
generating, for an application manifest that is formatted to provide an application behavior monitor with Signed and Sealed this
Twenty-second Day of March, 2016

Michelle K. Lee
*Director of the United States Patent and Trademark Office*